Dec. 22, 1959　　　　E. A. NEUGASS　　　　2,918,034
INSTRUMENT LIGHTING
Filed Oct. 1, 1957　　　　　　　　　　　　　　　2 Sheets-Sheet 1
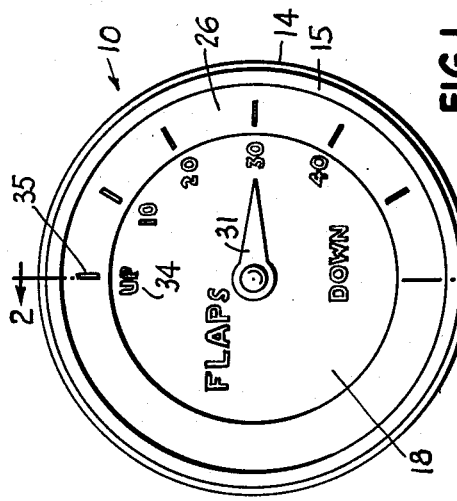
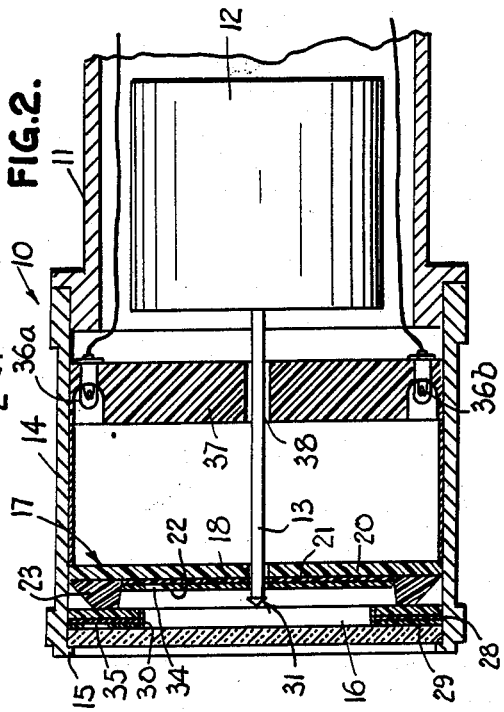
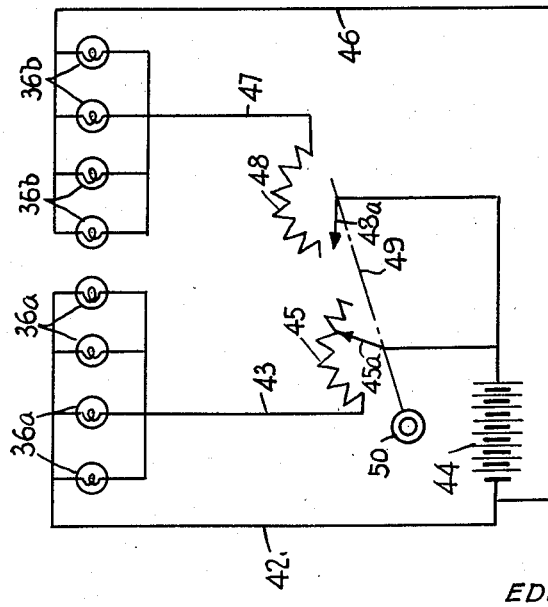
INVENTOR.
EDWIN A. NEUGASS.
BY
ATTORNEY.

Dec. 22, 1959     E. A. NEUGASS     2,918,034
INSTRUMENT LIGHTING
Filed Oct. 1, 1957     2 Sheets-Sheet 2
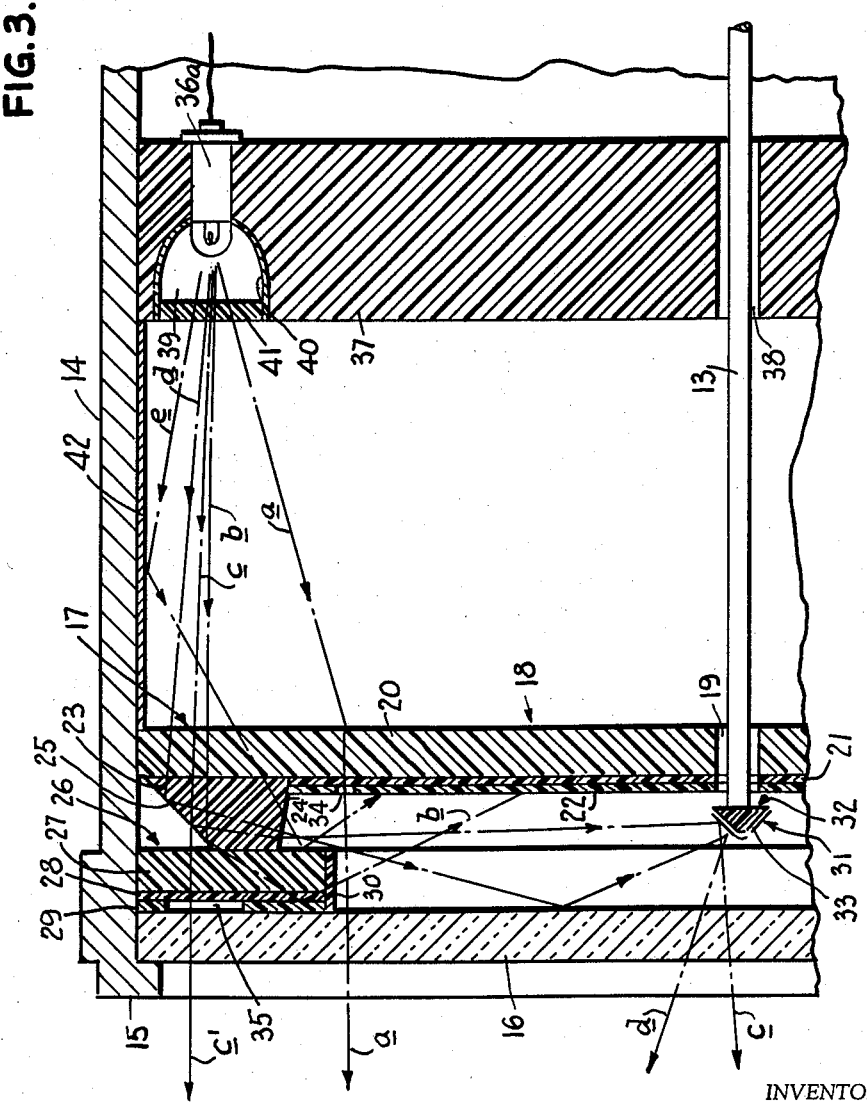
INVENTOR.
EDWIN A. NEUGASS.
BY
ATTORNEY.

United States Patent Office 2,918,034
Patented Dec. 22, 1959

2,918,034
INSTRUMENT LIGHTING

Edwin A. Neugass, Poteau, Okla.

Application October 1, 1957, Serial No. 687,561

16 Claims. (Cl. 116—129)

The present invention relates generally to instrument lighting, and is particularly directed to improvements in integral instrument lighting, that is, wherein the case of the instrument contains the source or sources of illumination.

It is an object of the present invention to provide integral lighting for a standard aircraft instrument that requires a minimum of change or alteration of the latter and that satisfies all of the pertinent military or other specifications as well as the human requirements for efficient viewing of the indication provided by the instrument under all possible operating conditions.

More specifically, it is an object of the invention to provide integral lighting for aircraft instruments and the like requiring a minimum amount of space for achieving artificial illumination of indicia and the like provided on the face or dial of the instrument and also of the movable pointer or hand associated therewith, while, at the same time, satisfying the conditions for efficient viewing of the indicia and the pointer under ambient illumination or daylight.

Most existing instrument lighting systems include a ring or segment of light transmitting material disposed in front of the usual metal dial and emitting light radially inward against the face of the dial and the associated pointer or hand. However, such light emitting rings or segments either direct light into the eyes of the viewer, when the instrument is viewed in a direction forming a small acute angle with the plane of the dial, or throw a large amount of light downwardly into the cockpit, when illumination is provided by a segment disposed above the instrument face, and, in either case, the dark adaptation of the viewer's eyes is destroyed.

Accordingly, it is a further object of the invention to provide instrument lighting that effectively avoids disturbance of the dark adaptation of the viewer's eyes.

Still another object is to provide instrument lighting capable of satisfying all the detail requirements as set forth in military specifications NIL-L-25467A(ASG) and MIL-P-7788.

A still further object of the invention is to provide instrument lighting employing a relatively large number of bulbs as the source of illumination, and which are operated at a sufficiently low voltage so that the failure of any one or two bulbs will not seriously impair the effectiveness of the illumination of the instrument.

Further, it is another object of the invention to provide instrument lighting of the described character, wherein the dial and the pointer or hand of the instrument may be selectively illuminated either with red or white light so that, under normal night flying conditions, the red illumination may be employed to retain the dark adaptation of the viewer's eyes, while, at extremely high altitudes, for example, fifty thousand feet or higher, where the intense light of the sun, the lack of diffusion of such light by overhead clouds or by dust motes in the atmosphere, and the reflection of light from the earth or from clouds covering the earth make it necessary for the pilot to wear relatively dark sunglasses so that the instruments cannot normally be effectively viewed, the relatively bright white illumination of the instruments may be employed to make possible the efficient viewing thereof.

In accordance with an aspect of this invention, the dial of an instrument is formed of a laminated material, for example, as disclosed in United States Letters Patent No. 2,518,726, issued August 15, 1950, to Charles N. Shlenker, and including a sheet of light transmitting material, a layer of white translucent material on the front surface of the light transmitting sheet and a black, opaque layer covering the white translucent layer and having openings therein to define the desired indicia, letters and numerals of the dial. The source or sources of illumination are disposed in back of the dial to transilluminate the translucent layer of the latter at the locations of the openings in the front, black opaque layer, and thereby to provide glare-free illumination of the indicia, letters and numerals of the dial. The shaft of the associated instrument extends forwardly through a central opening in the dial and, at its forward end, carries the hand or pointer which is preferably of triangular cross-section so that the hand or pointer has two inclined front faces each at an angle of approximately 45° with respect to the plane of the dial. In order to effect illumination of the hand or pointer, a ring prism of light transmitting material extends forwardly from the peripheral portion of the light transmitting sheet of the dial and is adapted to receive light passing through the peripheral portion of the dial from the source or sources disposed in back of the latter. The ring prism is adapted to radially inwardly reflect a portion of the light received thereby, thereby to direct such radially inward reflected light against the faces of the pointer or hand and also against the front face of the dial, in the latter case, partly by reflection from the back surface of the cover glass at the front of the instrument, thereby to illuminate the pointer or hand and also to provide some background illumination of the dial so as to avoid the failure of depth perception with respect to the red illuminated letters or numerals of the dial which would make such illuminated letters or numerals appear to "dance in space." Further, in accordance with the invention, an annular calibration dial formed of a laminated material similar to that employed for the previously mentioned dial is carried by the front face of the ring prism and is adapted to shield the latter so that light emitted from the ring prism will not be directed into the viewer's eyes, whereas openings may be provided in the front, black opaque layer of the annular dial to define calibration indicia which are transilluminated by light rays which pass through the ring prism and are not radially reflected by the latter.

The above, and other objects, features and advantages of the invention, will be apparent in the following detailed description of an illustrative embodiment thereof which is to be read in connection with the accompanying drawings forming a part hereof, and wherein:

Fig. 1 is a front elevational view of an instrument having its dial and hand or pointer illuminated in accordance with the present invention;

Fig. 2 is an axial sectional view taken along the line 2—2 of Fig. 1;

Fig. 3 is an enlarged detail view of a portion of Fig. 2; and

Fig. 4 is a wiring diagram of the electrical means associated with the instrument of Figs. 1, 2 and 3 for controlling the illumination thereof.

Referring to the drawings in detail, and initially to Figs. 1 and 2 thereof, it will be seen that an instrument illuminated in accordance with the present invention, and there generally identified by the reference numeral 10, includes a cylindrical metal case 11 housing an instrument movement 12 for actuating a forwardly extending shaft 13 and having a cylindrical, preferably removable extension 14 on the forward end of the case 11. The forward end of the cylindrical extension 14 has an inwardly directed rim 15 for retaining a clear cover glass 16, and a dial structure, generally identified by the reference numeral 17, is disposed within the extension 14 in back of the cover glass 16.

In accordance with the present invention, the dial structure 17 includes a disc 18 of laminated material, for example, as disclosed in United States Letters Patent No. 2,518,726, issued August 15, 1950, to Charles N. Shlenker, fitting closely within the extension 14 and having a central aperture 19 through which the forward end of shaft 13 projects. The disc 18 has a body 20 of light transmitting material, for example, methyl methacrylate, sold under the trade name "Lucite" or "Plexiglas." A thin sheet or layer 21 of translucent, preferably plastic material extends over the entire front surface of the body 20 with the exception of an annular area at the outer periphery of such front surface, and may be formed of a plastic material of the class of polyvinyl or vinyl resins or materials, their polymers or copolymers, such as, for example, the material designated as VU-4900 white 12M produced by the Bakelite Division of Union Carbide Company, although certain acrylic white epoxy, and other translucent paints are usable for the layer or coating 21. The layer 21 is white or light colored, and the disc 18 is completed by a black, opaque layer 22 which is superposed over the white translucent layer 21 and is also preferably formed of a plastic material of the class of polyvinyl or vinyl resins or materials, their polymers or copolymers, for example, the vinyl material designated as VU-5910 black O1, and also available from the Bakelite Division of Union Carbide Company. The body 20 and layers 21 and 22 of disc 18 may be laminated together under heat and pressure, as disclosed in United States Letters Patent No. 2,518,726, identified more fully above.

The dial structure 17 further includes a ring prism 23 formed of a clear, light transmitting material, such as, methyl methacrylate, and is adhesively or otherwise joined to the front face of the body 20 of disc 18 at the peripheral portion of the front surface of the body 20 from which the layers 21 and 22 have been omitted.

As seen in Fig. 3, the ring prism 23 has annular inner and outer peripheral surfaces 24 and 25, respectively, which converge forwardly, with the outer surface 25 being inclined with respect to the axis of the shaft 13 by an angle of approximately 43°, while the inner surface 24 is oppositely inclined with respect to the axis of shaft 13 by an angle of approximately 10°.

The dial structure 17 is completed by an annular member 26 formed of laminated material similar to that employed in the disc 18, and therefore including a body 27 of light transmitting material, a layer 28 of white translucent material covering the front surface of the body 27, and a layer 29 of black opaque material superposed on the translucent layer 28. The light transmitting body 27 of annular member 26 is suitably secured, for example, by adhesive or by heat and pressure, to the front surface of ring prism 23, so that the disc 18, ring prism 23 and annular member 26 form a single unit for installation within the extension 14 of instrument case 11. Further, referring to Fig. 3, it will be seen that the disc 18, ring prism 23 and annular member 26 all have equal outer diameters for close engagement within the extension 14, while the inner diameter of annular member 26 is substantially smaller than the inner diameter of ring prism 23, thereby to overhang the prism, in the radially inward direction, and to prevent direct viewing of the inner surface 24 of prism 23 when the illuminated instrument is viewed in directions at an angle with respect to the axis of shaft 13.

It will be seen that a black opaque coating 30, for example, of a vinyl base paint, is applied to the inner peripheral edge of the annular member 26 thereby to prevent the escape of light from that inner peripheral edge.

The inner and outer peripheral surfaces 24 and 25 of ring prism 23 are polished in order to improve the reflection from such surfaces for the purpose hereinafter described in detail.

At its forward end, the shaft 13 carries a pointer or hand 31 which may be formed of metal, but which is preferably formed of an elongated body 32 of methyl methacrylate having triangular cross-sections, as shown in Fig. 3, to define two oppositely inclined front faces at 45° with respect to the axis of shaft 13 and coated, as at 33, with a white reflective paint.

As seen in Figs. 1 and 3, the black, opaque layers 22 and 29 of disc 18 and an annular member 26 are provided with openings 34 and 35, respectively, therein to define letters or numerals in the portion of the dial structure provided by the disc 18 and calibration lines in the portion of the dial structure provided by the annular member 26, so that such letters and numerals and calibration lines can cooperate with the pointer or hand 31 to give a visual indication of the conditions sent by the instrument movement 12. Since the openings 34 and 35 in the layers 22 and 29, respectively, of black opaque material uncover the underlying portions of the white translucent material of the layers 21 and 28, respectively, it will be apparent that the letters, numerals and calibration lines defined by such openings are clearly visible under ambient illumination or daylight by reason of the sharp contrast existing between the exposed white translucent material and the background of black opaque material. Similarly, the white reflective paint of the coating 33 on the pointer or hand 31 provides a sharp contrast between the pointer or hand and the black background therefor defined by the black opaque layer 22 of the disc 18.

In accordance with the present invention, artificial illumination of the letters, numerals and calibration lines defined by the openings 34 and 35 in layers 22 and 29, respectively, and of the pointer or hand 31 is effected from a plurality of light sources disposed within the extension 14 in back of the dial structure 17. In the illustrated embodiment of the invention, such light sources are in the form of incandescent light bulbs 36a and 36b, for example, General Electric No. 328 lamps, which are suitably mounted in a relatively thick disc 37 of white methyl methacrylate, for example, "Lucite" or "Plexiglas." The disc 37 has a central bore 38 through which the shaft 13 extends, and the light bulbs 36a and 36b, which are preferably at least eight in number, are mounted in the disc 37 in a circular arrangement adjacent the outer periphery of the latter. The light bulbs 36a and 36b face forwardly, as shown in Figs. 2 and 3, and the front face of the disc 37 is formed with a generally parabolic recess 39 accommodating each light bulb and which may be lined with a parabolic metal reflector 40 to ensure that the rays of light emitted from each light bulb will be directed forwardly out of the related recess 39 toward the dial structure 17. The recesses 39 accommodating the light bulbs 36a, which may be four in number, are each provided with a red filter 41, for example, of the material known as "Plexiglas Filter 2177," extending across the front opening of the related recess 39 so that all the light emitted from each bulb 36a is influenced by the related filter 41 which passes only red light of a desired wave length. On the other hand, the recesses 39 accommodating the light bulbs 36b, which may be four or more in number, are open at the front, so that white light from the light bulbs 36b is directed forwardly against the dial structure 17. The light bulbs 36a and 36b are preferably alternately disposed in the circular arrangement thereof so that, when the bulbs 36a and 36b are alternately energized, as hereinafter described in detail, the red or white light impinging against the light transmitting body 20 of the dial structure is substantially uniformly distributed thereacross. In order to further the uniform distribution of light impinging against the body 20 of the dial structure, the inner surface of the cylindrical case extension 14 is provided with a coating 42 of white reflective paint, particularly along the length thereof between the disc 37 and the dial structure 17.

Referring now to Fig. 4, it will be seen that all of the light bulbs 36a, that is, the bulbs having red filters 41 associated therewith, are connected together, in parallel, between conductors 42 and 43 which are connected to a source of electric energy, for example, a battery 44, with a variable resistance 45 being interposed in the conductor 43 for varying the intensity of the light emitted from the light bulbs 36a. Similarly, all of the other light bulbs 36b are connected together, in parallel, between conductors 46 and 47 which are also connected to the source 44, with a variable resistance 48 being interposed in the conductor 47 for controlling the intensity of illumination provided by the bulbs 36b. The variable resistances 45 and 48 are jointly operated so that the bulbs 36a and 36b are alternately energized. For example, as shown in Fig. 4, the movable contacts 45a and 48a may be both connected to a common actuating shaft 49 having a knob 50 thereon for manual rotation. The movable contacts 45a and 48a are angularly disposed relative to each other, so that, during turning of the knob 50 in the clockwise direction, as viewed in Fig. 4, the movable contact 55a initially engages the resistance element 45 to close the circuit for the bulbs 36a, and to progressively increase the amount of resistance in that circuit, while the movable contact 48a remains disengaged from the resistance 48, whereby the bulbs 36a are progressively dimmed. As the movable contact 45a moves off the resistance 45, to deenergize the bulbs 36a, the movable contact 48a comes into engagement with the resistance 48, thereby to complete the circuit for energizing the bulbs 36b. However, the resistance 48 is arranged, as shown, so that, upon initial engagement of movable contact 48a with resistance 48, substantially all of the value of that resistance is interposed in the circuit for bulbs 36b, and the amount of such resistance is progressively decreased as turning of the knob 50 continues in the clockwise direction. Thus, with the control arrangement illustrated in Fig. 4, turning of the knob 50 in the clockwise direction produces a change in the intensity of illumination by the bulbs 36a from bright to dim and, thereafter, change in the intensity of illumination by the bulbs 36b from dim to bright.

Referring to Fig. 3, it will be apparent that some of the light rays from the bulbs 36a or 36b, which are then illuminated, will impinge directly against the back surface of the light transmitting body 20, for example, the light ray a represented by a broken line, and will be transmitted through the body 20 to transilluminate the translucent layer 21 at the opening 34 in the black opaque layer 22. Other light rays, for example, the light ray b represented by a broken line, will enter the peripheral portion of the light transmitting body 20 and pass through the ring prism 23 for reflection at the polished outer surface 25 of the latter. The ray b, when reflected by the surface 25 will impinge against the white translucent layer 28 of annular member 26 and be reflected rearwardly against the exposed front face of the opaque layer 22 of disc 18. Other rays, for example, the ray c represented by a broken line, will also pass through the peripheral portion of the body 20 and be reflected at the outer surface 25 of ring prism 23 so as to pass radially inward through the inner surface 24 of the ring prism for impingement against the reflective coating 33 of the pointer or hand 31. Since the surface 25 of the ring prism 23 is not a total reflector, some of the rays striking thereagainst, for example, the ray c', will escape forwardly from the surface 25 of the ring prism to pass into the light transmitting body 27 of annular member 26, thereby to transilluminate the translucent layer 28 at the openings 35 in the opaque outer layer 29. Still other rays, for example, the ray d represented by a broken line, upon impinging against the outer polished surface 25 of ring prism 23 will be directed radially inward at an acute angle with respect to the plane of the cover glass 16 thereby to be totally reflected by the cover glass to strike against either the light reflective coating of the pointer 31 or against the front face of the dial portion on disc 18. It will be apparent that the overhang of the annular member 26 with respect to the inner periphery of the ring prism 23 will ensure that any rays of light emerging from the polished surface 24 of the ring prism in the direction toward the cover glass 16 will be cut off by such overhang unless the angle of incidence between the light ray and the plane of the cover glass is sufficiently small to ensure complete reflection of the light ray back toward the pointer or the disc 18 of the dial structure. Thus, for example, the light ray e represented by a broken line, after striking against the light reflective coating 42 within the extension 14 passes through both the peripheral portion of light transmitting body 20 and the ring prism 23 to strike against the polished back surface of the radially inward overhanging portion of light transmitting body 27 thereby to be reflected back towards the opaque coating 22 on the disc 18.

From the above it will be apparent that the dial structure 17 illuminated from the back in accordance with the present invention is effective to produce transillumination of the letters, numerals and indicia defined by the openings 34 and 35 and illumination of the pointer or hand 31, and also to direct some light against the front face of the disc 18 thereby to provide a low level of background illumination around the letters and numerals defined by the transilluminated openings 34 so that, when red light is employed for illumination, which is only seen with the foveal or central part of the retina, depth perception will not be lost and the numerals or letters will not appear to be "dancing in space," as would be the case if only the openings 34 were transilluminated with red light. Further, by reason of the above described arrangement of the dial structure 17 in cooperation with the reflecting characteristics of the cover glass 16, the direct passage of light from the ring prism 23 through the cover glass 16 toward the viewer is substantially prevented, even when the illuminated instrument is viewed in directions forming substantial angles with respect to the axis of the shaft 13.

With the above described arrangement for alternately energizing the light bulbs 36a and 36b, the light bulbs 36a having red filters 41 associated therewith will be energized during night flying conditions, thereby to provide transillumination and illumination of the various elements of the dial structure and of the pointer or hand with red light in order to avoid disturbance of the dark adaptation of the viewer's eye. Illumination by the light bulbs 36b which are effective to direct white light against the back of the dial structure 17 may be usefully employed under the conditions normally encountered at extremely high altitudes, for example, at altitudes of fifty thousand feet and more, where the intense light of the sun, the lack of diffusion of such light by overhead clouds and by dust motes in the air, and the reflection of the sun from the earth or from clouds covering the earth make it necessary for the pilot to wear sunglasses with which it is practically impossible to read the non-illuminated instruments. Under the above stated conditions, the white transillumination and illumination of the letters, numerals and indicia and of the pointer or hand will make possible the efficient reading of the instrument. Although only four light bulbs 36b are illustrated in Fig. 4, it is to be understood that a larger number of light bulbs for providing illumination with white light may be employed so that such illumination has an adequate intensity to permit effective reading of the instrument under any possible operating conditions.

In those cases where only illumination with red light is required, the individual red filters 41 may be dispensed with and the function thereof performed by the body 20 of the disc 18 wihich is then formed of red methyl methacrylate, for example, the material available as "Plexiglas Filter 2177." Even when only red light is required, the light bulbs may still be electrically arranged in independently energized groups so that one group of lights may be normally employed and the other group of light bulbs held in reserve for use only in the event of a failure in the first group of lights.

Although the illustrated embodiment of the invention employs incandescent light bulbs as the source or sources of illumination, it is to be understood that the disc 18 of the dial structure 17 may be constructed in accordance with the disclosure in United States Letters Patent No. 2,791,050, issued to me on May 7, 1957, so that an electroluminescent lighting plate will be disposed in back of the light transmitting body 20 to emit light forwardly into the latter. Since such an electroluminescent lighting plate normally emits blue light or light composed mostly of rays from the ultraviolet end of the spectrum, a suitable filter, for example, a coating of fluorescent dye on the back surface of the body 20, may be provided between the light transmitting body 20 and the electroluminescent lighting plate so that the light transmitting body 20 will transmit only red light. It is possible, by varying the frequency of the alternating current employed for energizing the above mentioned electroluminescent lighting plate, to vary the color of the light emitted therefrom, and further color changes may be achieved by making removable or replaceable the filter interposed between the electroluminescent lighting plate and the light transmitting body 20. The advantage of employing the electroluminescent lighting plate as the source of illumination, as described above, resides in the fact that the axial space within the instrument required for illumination of the dial structure and pointer or hand is thereby reduced.

Although a particular embodiment of the invention has been described in detail herein with reference to the accompanying drawings, it is to be understood that the invention is not limited to that precise embodiment, and that various changes and modifications may be effected therein without departing from the scope or spirit of the invention, except as defined in the appended claims.

What is claimed is:

1. In an instrument having a case closed by a cover glass at one end and a movement within the case for driving a shaft extending toward the cover glass; the combination of a dial structure behind the cover glass including a disc, an annular member and a ring prism of light transmitting material interposed axially between said annular member and a peripheral portion of said disc, said disc and said annular member being each formed of a laminated material having a rearmost light transmitting body, a white translucent layer covering the entire front surface of the body of said annular member and the portion of the front surface of said disc disposed radially inside said ring prism and a black opaque layer superposed on said translucent layer and having openings therein exposing the underlying translucent layer to define indicia on said annular member and disc, said disc having a central aperture to permit the shaft to extend therethrough, a pointer on the shaft movable in front of said disc of the dial structure to cooperate with said indicia in indicating the condition of the movement, and means within the case in back of said dial structure emitting light forwardly through said light transmitting body of the disc to transilluminate said indicia of the latter and to pass through said ring prism for radially inward reflection by the latter against said pointer to illuminate the latter and for further passage into said light transmitting body of the annular member to transilluminate said indicia of the latter.

2. In an instrument; the combination as in claim 1, wherein said pointer is of triangular cross-section and has oppositely inclined reflective front faces to direct light impinging thereagainst forwardly through the cover glass.

3. In an instrument; the combination as in claim 1, wherein said ring prism has a polished outer peripheral surface inclined toward the axis of the shaft in the direction toward the cover glass and operative to reflect rays of light toward said axis of the shaft.

4. In an instrument; the combination as in claim 3, wherein said outer peripheral surface of the ring prism is at an angle of approximately 43 degrees with respect to said axis of the shaft.

5. In an instrument; the combination as in claim 3, wherein said ring prism has an inner peripheral surface inclined with respect to said axis in the direction opposed to said outer peripheral surface so that light rays reflected by said outer peripheral surface, when passing through said inner peripheral surface, are refracted toward said disc.

6. In an instrument; the combination as in claim 3, wherein said annular member extends radially inward a substantial distance beyond said ring prism to intercept light rays passing out of the inner peripheral surface of the latter and directed against the cover glass at angles greater than the angle of incidence for total reflection from the cover glass.

7. In an instrument; the combination as in claim 1, wherein said means emitting light forwardly includes a plurality of light sources emitting white and red light, respectively, and means for alternatively operating said sources of white and red light, respectively.

8. In an instrument; the combination as in claim 1, wherein said means emitting light forwardly includes a plurality of incandescent light bulbs spaced rearwardly from said disc of the dial structure, and a light reflective coating on the interior surface of the case between said disc and the location of said light bulbs to uniformly distribute the light emitted from said bulbs over said light transmitting body of said disc.

9. In an instrument; the combination as in claim 8, further comprising electrical means for independently energizing a first group of said light bulbs and a second group of said light bulbs.

10. In an instrument; the combination as in claim 9, further comprising red filters disposed in front of only the light bulbs of said first group so that, during energizing of said first group of light bulbs, said openings defining indicia and said pointer are illuminated with red light and, during energizing of said second group of light bulbs, said openings defining indicia and said pointer are illuminated with white light.

11. In an instrument; the combination as in claim 8, further comprising a support disc of plastic material extending across the case in back of said dial structure and having said light bulbs mounted therein, said support disc having parabolic, forwardly opening recesses therein accommodating said light bulbs and forwardly reflecting the light rays from the latter.

12. In an instrument having a case closed by a cover glass at one end and a movement within the case for driving a shaft extending toward the cover glass; the combination of a dial structure in the case behind the cover glass including a disc, a ring prism extending forwardly from the periphery of said disc and an annular member spaced forwardly from said disc by said ring prism, said disc, ring prism and annular member all being of light transmitting material and said disc and annular member having means on the exposed front surfaces thereof defining indicia adapted to be illuminated by light directed forwardly through the light transmitting material thereof, means for emitting light forwardly against said disc to illuminate the indicia thereon and to pass through said ring prism and the light transmitting material of said annular member for illuminating the indicia on the latter, and a pointer on the shaft in front of said disc, said ring prism having an inclined, polished outer peripheral surface to direct light rays passing therethrough radially inward against said pointer for illuminating the latter.

13. In an instrument; the combination as in claim 12, wherein said pointer is of triangular cross-section and has oppositely inclined reflective front faces to direct light impinging thereagainst forwardly through the cover glass.

14. In an instrument; the combination as in claim 12, wherein said ring prism has an inner peripheral surface inclined with respect to said axis in the direction opposed to said outer peripheral surface so that light rays reflected by said outer peripheral surface, when passing through said inner peripheral surface, are refracted toward said disc.

15. In an instrument; the combination as in claim 14, wherein said annular member extends radially inward a substantial distance beyond said ring prism to intercept light rays passing out of the inner peripheral surface of the latter and directed against the cover glass at angles greater than the angle of incidence for total reflection from the cover glass.

16. In an instrument; the combination as in claim 12, wherein said means emitting light forwardly includes a plurality of light sources emitting white and red light, respectively, and means for alternatively operating said sources of white and red light, respectively.

References Cited in the file of this patent

UNITED STATES PATENTS

| | | |
|---|---|---|
| 2,259,910 | Rylsky | Oct. 21, 1941 |
| 2,537,971 | Dames | Jan. 16, 1951 |
| 2,562,498 | Le Boffe | July 31, 1951 |
| 2,594,081 | Shlenker | Apr. 22, 1952 |
| 2,772,651 | Amico | Dec. 4, 1956 |
| 2,837,052 | Viret | June 3, 1958 |
| 2,837,053 | Viret | June 3, 1958 |